United States Patent

Geissler et al.

[11] Patent Number: 5,610,562
[45] Date of Patent: Mar. 11, 1997

[54] WAVEGUIDE ABSORBER

[75] Inventors: Klaus H. Geissler, Backnang; Jürgen Damaschke, Heilbronn; Dieter Wolk, Winterbach, all of Germany

[73] Assignee: Ant Nachrichtentechnik GmbH, Backnang, Germany

[21] Appl. No.: 392,922
[22] PCT Filed: Nov. 8, 1993
[86] PCT No.: PCT/DE93/01064
 § 371 Date: Feb. 27, 1995
 § 102(e) Date: Feb. 27, 1995
[87] PCT Pub. No.: WO94/11249
 PCT Pub. Date: May 26, 1994

[30] Foreign Application Priority Data

Nov. 12, 1992 [DE] Germany .................. 42 38 136.3

[51] Int. Cl.[6] ............................ H01P 1/26; H01P 1/22
[52] U.S. Cl. .................... 333/22 R; 333/81 B; 333/248
[58] Field of Search ........................ 333/22 R, 81 B, 333/248

[56] References Cited

U.S. PATENT DOCUMENTS

| | | | |
|---|---|---|---|
| 3,617,960 | 11/1971 | Lavedan, Jr. | 333/248 X |
| 3,758,883 | 9/1973 | Cox et al. | 333/248 X |
| 3,811,099 | 5/1974 | Mason et al. | 333/248 X |
| 4,638,272 | 1/1987 | Ive | 33/22 R |
| 4,906,952 | 3/1990 | Praba et al. | 333/22 R |

FOREIGN PATENT DOCUMENTS 87501 5/1985 Japan ................. 333/22 R

OTHER PUBLICATIONS

Taschenbuch der Hochfrequenztechnik, Meinke, et al, 1968, pp. 443–445.

*Primary Examiner*—Paul Gensler
*Attorney, Agent, or Firm*—Michael J. Striker

[57] ABSTRACT

A waveguide absorber which withstands high mechanical and thermal loads is typified in that a member (4) exhibiting absorber material is clamped between waveguide walls (5, 6) in such a way that at least one wall region (5) adjoining the member (4) is constructed flexibly, and that a force acting on the flexible wall region (5) presses the latter against the member (4).

2 Claims, 1 Drawing Sheet

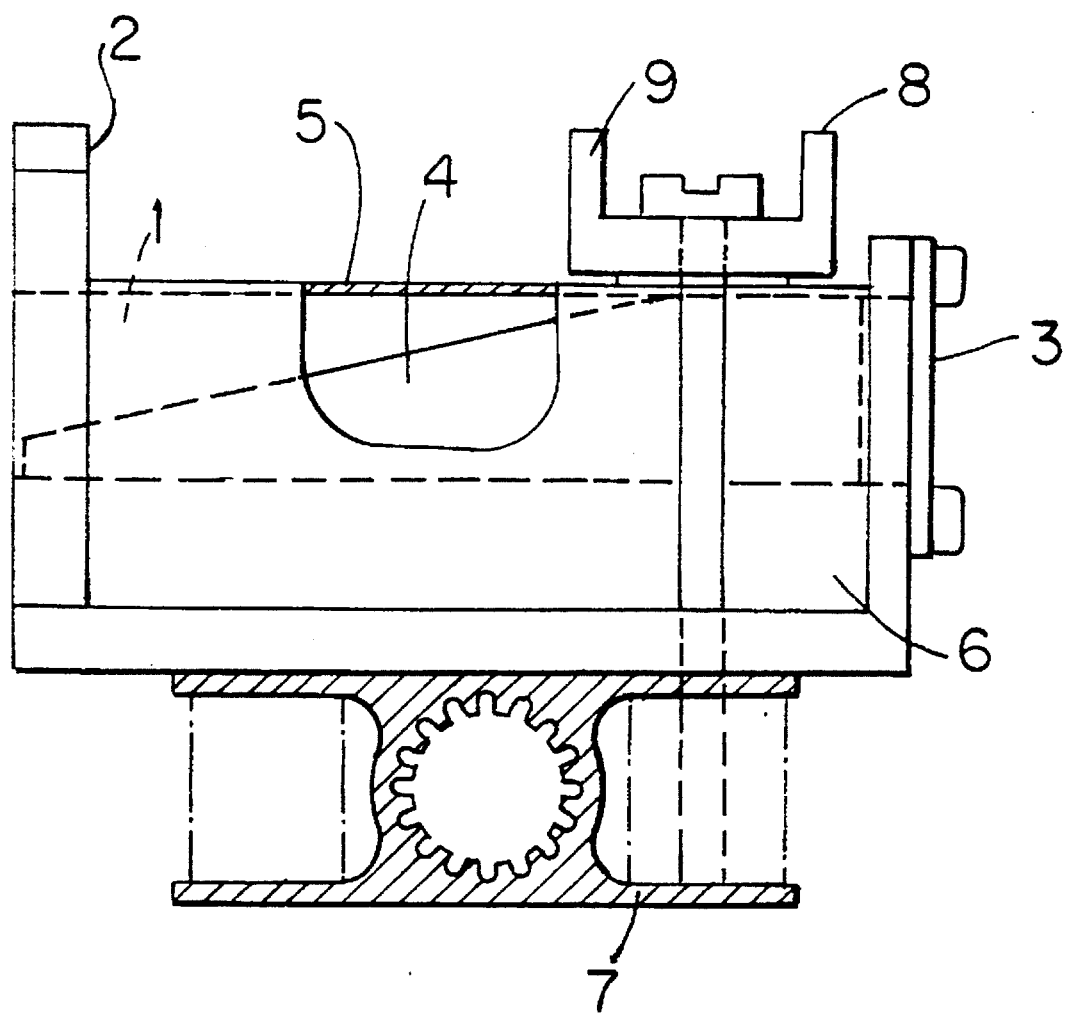

WAVEGUIDE ABSORBER

BACKGROUND OF THE INVENTION

The present invention relates to a waveguide absorber which has at least one member inserted into a waveguide and exhibiting absorber material.

Terminating impedances and attenuators are frequently required in microwave technology. Use is made as such of waveguide absorbers such as are disclosed, for example, in the "Taschenbuch der Hochfrequenztechnik" ["Manual of radio-frequency technology"], H. Meinke and F. W. Gundlach, 3rd edition, 1968, pages 443 to 445. This publication does not reveal the means by which the members consisting of absorber material and arranged in the waveguide are fixed.

Special requirements for fixing the absorbing member are to be made for the application of waveguide absorbers in the field of space flight. The fixing is to be able to withstand high mechanical and thermal loads. It is the object of the present invention to specify a waveguide absorber of the type mentioned at the beginning which fulfils the abovementioned requirements.

SUMMARY OF THE INVENTION

Accordingly, it is an object of the present invention to provide a waveguide absorber which eliminates the disadvantages of the prior art.

In keeping with these objects and with others which will become apparent hereinafter, one feature of the present invention resides, briefly stated, in a waveguide absorber which has at least one member inserted into a waveguide and composed at least partially of absorber material, wherein the member is clamped between opposing waveguide walls by providing that at least one wall region resting on the member is constructed flexibly, and that a force acting on the flexible wall region presses the latter against the member and the flexible wall region is realized by a strong reduction of wall thickness of one of said waveguide walls in the wall region resting on the member as compared with the opposing, rigid, waveguide wall.

In accordance with another advantageous feature of the flexible wall region is realized by an appropriately strong reduction in the wall thickness.

In accordance with still another feature of the present invention, a pressure clamp exerts the clamping pressure on the flexible wall region, rests on the flexible wall region and is screwed to a wall region of the waveguide which is opposite the flexible wall region. The clamping pressure is produced by a correspondingly tight screwing of the pressure clamp to the opposite wall region.

Finally, the pressure lamp can be formed as screws which can be screwed against the flexible wall region in order to be able to produce the clamping pressure.

The invention has the advantage that no use is made for fixing the absorber member of the usual materials such as adhesive or solder, which often do not withstand very high thermal or mechanical stress. In addition, the mechanical outlay is very low in the waveguide absorber according to the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings shows an exemplary embodiment of the present invention.

DESCRIPTION OF A PREFERRED EMBODIMENT

The FIGURE shows a side view of a rectangular waveguide 1 which is provided at one end with a flange 2, and whose other end is sealed by a cover 3. Inserted into this waveguide 1 is a member 4 which consists at least partially of a thermostable absorber material (for example, silicon carbide). The member 4 extends with a subregion over the entire height of the waveguide and has the shape of a wedge. The absorber member can have any arbitrarily different shape; it depends, for example, on the electrical requirements and on the mounting position in the waveguide. It is important that the member extends at least partially over the entire height of the waveguide (or the entire diameter of the waveguide in the case of a round waveguide), so that it can be clamped between mutually opposite wall regions of the waveguide.

In order to fix the member 4 in the waveguide 1 by clamping, the thickness of one waveguide wall 5 is so strongly reduced at least in the region resting on the member 4 that this region is flexible. If a pressure is exerted on this flexible wall region 5, the member 4 is pressed against the opposite rigid waveguide wall 6. The result is a contact, which conducts heat well, between the member 4 and this waveguide wall 6 on whose outside a cooling system, for example a heat pipe, is arranged in accordance with the illustrated exemplary embodiment.

A pressure clamp 8 lying on the flexible wall region 5 is fastened by means of screws 9 to the opposite waveguide wall 6. By means of these fastening screws 9 themselves, either the pressure clamp 8 can be tensioned so far that it exerts the required clamping pressure on the flexible wall region 5, or it is possible apart from the fastening screws 9 to provide in addition in the pressure clamp 8 screws which can be screwed against the flexible wall region 5.

We claim:

1. A waveguide absorber which has at least one member inserted into a waveguide and composed at least partially of absorber material, wherein the member (4) is clamped between waveguide walls (5, 6) by providing that at least one wall region (5) resting on the member (4) is constructed flexibly, and that a force acting on the flexible wall region (5) presses the latter against the member (4), also provision is made of a pressure clamp (8) which exerts the clamping pressure on the flexible wall region (5), rests on the flexible wall region (5) and is screwed to a wall region (6) of the waveguide (1) which is opposite said flexible wall region.

2. The waveguide absorber as claimed in claim 1, wherein the clamping pressure is produced by a correspondingly tight screwing of the pressure clamp (8) to the opposite wall region (6).

* * * * *